No. 648,818. Patented May 1, 1900.
W. WEBBER.
GUIDE BOARD FOR SELF BINDING HARVESTERS.
(Application filed Jan. 30, 1899.)
(No Model.)

WITNESSES:
Lewis H. Williams
John M. Culver

INVENTOR
William Webber
BY
R. B. Swift.
ATTORNEY.

UNITED STATES PATENT OFFICE.

WILLIAM WEBBER, OF CHICAGO, ILLINOIS, ASSIGNOR TO THE McCORMICK HARVESTING MACHINE COMPANY, OF SAME PLACE.

GUIDE-BOARD FOR SELF-BINDING HARVESTERS.

SPECIFICATION forming part of Letters Patent No. 648,818, dated May 1, 1900.

Application filed January 30, 1899. Serial No. 703,936. (No model.)

*To all whom it may concern:*

Be it known that I, WILLIAM WEBBER, a citizen of the United States, residing at Chicago, in the county of Cook and State of Illinois, have invented a new and useful Guide-Board for Self-Binding Harvesters, of which the following is a specification.

My invention relates to improvements in guide or wind boards for guiding the heads of the stream of grain that is flowing into the binding attachment of a self-binding harvester; and the objects of my improvement are, first, to provide a board that will automatically act as a guide for the heads of the grain when the binding attachment is adjusted on the frame of the harvester for binding short grain centrally, which board will when the attachment is adjusted rearwardly for binding long grain centrally fold against the binder-deck, so that the long grain can pass over it without being retarded, and, second, to the means for actuating this board by the movement of the binding attachment. I attain these objects with the mechanism illustrated in the accompanying drawings, in which—

Figure 1:
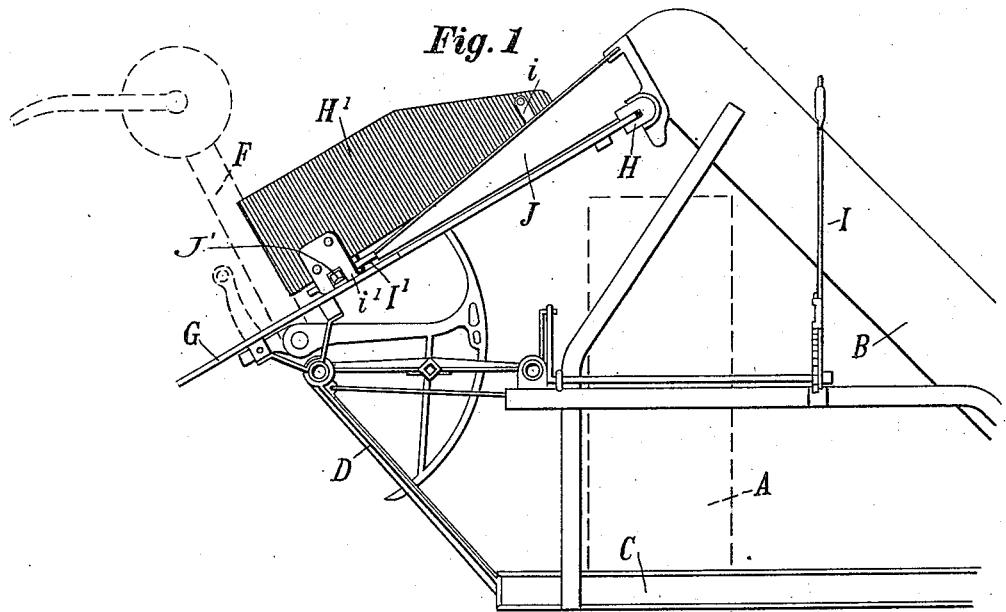
Figure 2:
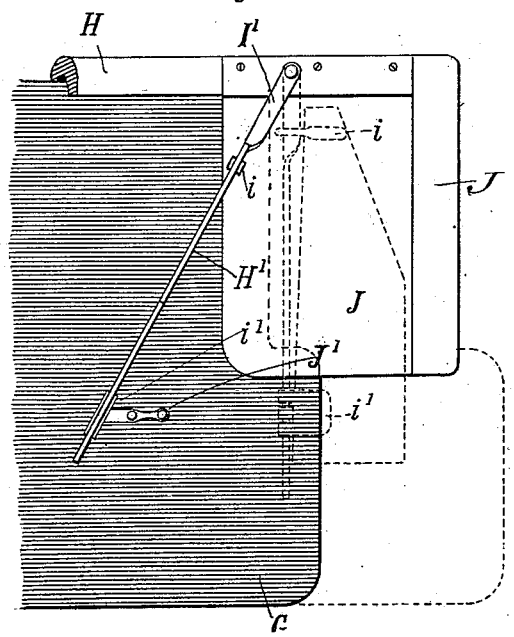
Figure 3:
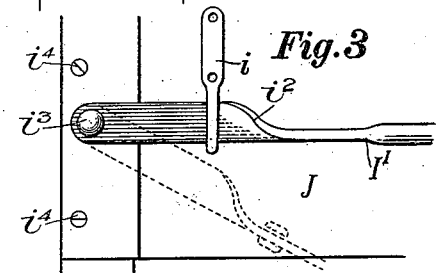
Figure 4:
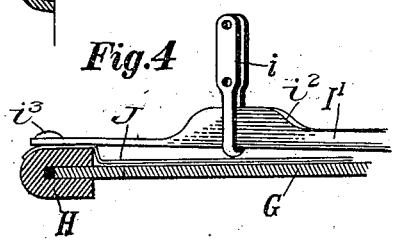

Figure 1 is a rear elevation of so much of the frame and binding attachment of a self-binding harvester as is necessary to show my improvement. Fig. 2 is a top view of my improvement with the parts of the machine to which it is attached. Fig. 3 is an enlarged top view of the bar upon which the board is mounted; and Fig. 4 is an end view of the deck-guide and deck, showing the bar to which the board is attached.

Similar letters refer to similar parts throughout the several views.

The grain after being cut by a modern self-binding harvester is transported on endless carriers over the main or driving wheel of the machine to a binding attachment, where it is apportioned into bundles and bound and discharged. There are many causes that influence the position of the grain on the carriers, tending to move it to the front of the machine or to the rear. When the machine is of the closed-elevator type, the side-boards will act as guides for the stream of grain; but when the machine is of the modern open-elevator construction, the rear guide-board being dispensed with, the stream in going up a hill will be carried so far to the rear as to many times be bound too close to the butts. A positive guide or wind board is therefore necessary to carry the stream of grain into the binder. Heretofore such boards have usually been held by springs, so as to be forced out of the way when long grain was encountered; but in my improved construction the board when acting as a guide is rigidly held, thus making a positive chute to the binding device.

In the drawings, A represents the main wheel of the harvester, and it is shown in dotted lines; B, the elevator-frame, and C the main harvester-frame. Attached to this framing on the support D is a binding attachment F. The grain is carried over the elevator B and deposited upon the deck G, down which it slides to the binding devices. The binder is adjusted back and forth along the delivery end of the elevator, the deck G sliding in the fixed grooved rail H by the adjusting-lever I. When the binder is adjusted forward, as shown in Fig. 2, the heads of the grain are supported and the mechanisms upon the machine are covered by a supplemental apron J, which is secured at its upper edge to the fixed rail H by screws $i^4$ or otherwise and projects outwardly over the front edge of the deck.

The guide or wind board H' is positioned transversely of the deck of the binder and is supported and held in place by the pivoted bar I'. This bar is pivoted to the harvester-frame at its inner end and extends outwardly close to and above the surface of the deck G. In the drawings it is shown pivoted at $i^3$ to the fixed grooved rail H. The inner end of the bar I' is flattened, as shown in Fig. 3, and this flattened portion is given a quarter turn or twist $i^2$, also clearly shown in Fig. 3. The board H' is held upon this bar by a staple $i$, secured to the board near its inner end, and a corresponding staple $i'$, secured near the outer end of the board. The bar I' passes loosely through these staples and forms a pintle, upon which the board may be turned into vertical or horizontal position as on a hinge.

To govern the movement of the board, a bracket J' is secured to the deck G of the binder, and the pivoted bar I' passes through this bracket, which is bored large in order that the bar, whose upper end is fixed, may slide therethrough as the binder-deck is adjusted for long or short grain. The staple $i'$ near the outer end of the board H' is provided with two ears, and the bracket J' is held upon the bar I' between these ears. The board is thus kept in fixed relation to the bracket and compelled to slide along the bar with the bracket as the binder moves.

The movement of the binder is in a straight line, and the board H' being held thereto by the bracket J' moves bodily with it. The rod I', however, being pivoted at a fixed point at its inner end, its outer end describes an arc, and the board H' must move relatively to the bar and lengthwise thereof as the binder is adjusted. As shown in Fig. 4, the staple $i'$ near the upper end of the board fits the flat part of the bar J, and as the board is slid on the bar its movement will conform to the turn or twist in the flat part of the bar. It will therefore be turned down practically parallel to the surface of the deck when the board is slid upwardly along the bar and will be turned up, so as to stand at right angles to the deck, when it is slid down on the bar.

In operation the binder is adjusted by means of the lever I in the usual manner to place the band centrally around the grain. This fore-and-aft movement of the binder (including the deck G) carries with it the bracket J' and the board H', thus sliding the board along the pivoted bar I'. The staple $i$, moving along the bar, gives the board the quarter-turn corresponding to the twist $i^2$ in the bar and throws the board down on the deck when the binder is moved forward into the position shown in dotted lines in Fig. 2. When the binder is thrown back, the bracket J' slides the board H' outwardly along the bar I', and as the board moves along the bar the twist or turn in the flat part of the bar causes the board to rise into the vertical position shown in Fig. 1.

Having now described my invention, what I claim, and desire to secure by Letters Patent, is—

1. The combination, with a binder adjustable on the delivery end of the harvester, of a bar pivoted at one end to the harvester, means for moving the other end of the bar with the binder, a board mounted on the bar and means for turning the board on the bar as the binder is adjusted.

2. The combination, of an adjustable binder, a bar connected to the harvester and moving with the binder, a board mounted on the bar, and means for turning the board as the binder is adjusted.

3. The combination, to form a guide or wind board for self-binding harvesters, of a binding attachment adjustable along the delivery end of the harvester, a board having its receiving end positioned at the delivery end of the elevator, and its discharge end moving with the binder, and means whereby the board is turned down upon the binder-deck when the binder is adjusted for long grain and may be turned up perpendicular to the deck when adjusted for short grain.

4. The combination, with a binder adjustable on the harvester, of a bar pivoted at one end to the harvester, a bracket fixed to the deck of the binder which serves as a guide for the other end of the bar, a board mounted on the bar the delivery end of which is controlled by the bracket, a guide on the board and a twist in the bar, substantially for the purpose specified.

WILLIAM WEBBER.

Witnesses:
JOHN W. PRIDMORE,
EDWARD A. JOHNSTON.